United States Patent
Brent

(10) Patent No.: US 9,566,550 B2
(45) Date of Patent: Feb. 14, 2017

(54) INTEGRATED CHEMICAL PROCESS

(75) Inventor: Geoffrey Frederick Brent, Valentine (AU)

(73) Assignee: ORICA EXPLOSIVES TECHNOLOGY PTY LTD, Melbourne, Victoria (AU)

(*) Notice: Subject to any disclaimer, the term of this patent is extended or adjusted under 35 U.S.C. 154(b) by 649 days.

(21) Appl. No.: 12/515,859

(22) PCT Filed: Nov. 21, 2007

(86) PCT No.: PCT/AU2007/001790
§ 371 (c)(1),
(2), (4) Date: Jul. 6, 2009

(87) PCT Pub. No.: WO2008/061305
PCT Pub. Date: May 29, 2008

(65) Prior Publication Data
US 2009/0305378 A1    Dec. 10, 2009

(30) Foreign Application Priority Data

Nov. 22, 2006  (AU) .................................. 2006906519
Apr. 4, 2007   (AU) .................................. 2007901812

(51) Int. Cl.
| | | |
|---|---|---|
| B01D 53/62 | (2006.01) | |
| B01D 53/80 | (2006.01) | |
| C01F 5/24  | (2006.01) | |
| C01F 11/18 | (2006.01) | |
| C04B 14/04 | (2006.01) | |

(Continued)

(52) U.S. Cl.
CPC .............. *B01D 53/62* (2013.01); *C01B 31/24* (2013.01); *C01D 7/00* (2013.01); *C01F 5/24* (2013.01); *C01F 11/18* (2013.01); *B01D 2255/00* (2013.01); *B01D 2257/504* (2013.01); *B01D 2259/80* (2013.01); *Y02C 10/04* (2013.01); *Y02P 20/129* (2015.11); *Y02P 20/152* (2015.11)

(58) Field of Classification Search
None
See application file for complete search history.

(56) References Cited

U.S. PATENT DOCUMENTS

| | | |
|---|---|---|
| 2,345,655 A | 4/1944 | Brandenburg |
| 2,384,009 A | 4/1945 | Brandenburg |

(Continued)

FOREIGN PATENT DOCUMENTS

| | | |
|---|---|---|
| CA | 435489 A | 6/1946 |
| CA | 435490 A | 6/1946 |

(Continued)

OTHER PUBLICATIONS

Huijgen, W.J.J. et al "Energy Consumption and Net CO2 Sequestration of Aqueous Mineral Carbonation" Ind. Eng. Chem. Res.,2006, 45(26), pp. 9184-9194.*

(Continued)

*Primary Examiner* — Daniel Berns
(74) *Attorney, Agent, or Firm* — Birch, Stewart, Kolasch & Birch, LLP

(57) ABSTRACT

A mineral carbonation process, characterized in that the silicate feedstock is thermally activated by using heat generated from the combustion of fuel prior to reacting the activated slurry feedstock with carbon dioxide.

30 Claims, 10 Drawing Sheets

(51) Int. Cl.
*B01J 20/04* (2006.01)
*B01J 20/10* (2006.01)
*B01J 20/30* (2006.01)
*C01B 31/24* (2006.01)
*C01B 33/22* (2006.01)
*C01B 33/24* (2006.01)
*C01D 7/00* (2006.01)

(56) References Cited

U.S. PATENT DOCUMENTS

| | | | |
|---|---|---|---|
| 2,384,008 A | | 9/1945 | Brandenburg |
| 2,384,010 A | | 9/1945 | Brandenburg |
| 4,409,192 A | * | 10/1983 | Lichtner et al. ............ 423/242.7 |
| 2004/0131531 A1 | | 7/2004 | Geerlings et al. |
| 2005/0180910 A1 | | 8/2005 | Park et al. |
| 2011/0256048 A1 | * | 10/2011 | Brent ............................ 423/432 |
| 2012/0288431 A1 | * | 11/2012 | Chizmeshya et al. ........ 423/331 |

FOREIGN PATENT DOCUMENTS

| | | | | |
|---|---|---|---|---|
| CA | 435491 A | | 6/1946 | |
| JP | 11-104440 | * | 4/1999 | ............ B01D 53/40 |
| WO | WO 02085788 A1 | * | 10/2002 | |
| WO | WO-2004/037391 A1 | | 5/2004 | |
| WO | WO-2005/108297 A2 | | 11/2005 | |
| WO | WO-2007/060149 A1 | | 5/2007 | |

OTHER PUBLICATIONS

Gerdemann et al "Factors Affecting Ex-Situ Aqueous Mineral Carbonation Using Calcium and Magnesium Silicate Minerals" DOE/ARC-2004-032, 2004, 12 pages.*

Allen, G.J. and Brent, G.F."Sequestering CO2 by Mineral Carbonation: Stability Against Acid Rain Exposure" Environ. Sci. Technol. 2010, 44(7), pp. 2735-2739.*

"Furnace." TheFreeDictionary.com (2015) (viewed Nov. 23, 2015 at www.thefreedictionary.com/furnace).*

Extended European Search Report issued in EP Application No. 07815592.6 on Mar. 12, 2012.

O'Connor et al., "Carbon Dioxide Sequestration by Direct Mineral Carbonation with Carbonic Acid", International Converence on Coal Utilization and Fuel Systems, (Mar. 6, 2000) pp. 153-164.

* cited by examiner

INTEGRATED CHEMICAL PROCESS

The present invention relates to a process for the permanent and safe sequestration of carbon dioxide gas and is particularly concerned with an efficient integrated process for the chemical conversion of carbon dioxide to solid carbonates thereby reducing the accumulation of carbon dioxide in the atmosphere.

The sequestration of carbon dioxide gas in repositories that are isolated from the atmosphere is a developing technology that is widely recognised as an essential element in global attempts to reduce carbon dioxide emissions to the atmosphere. The rapid increase in atmospheric carbon dioxide concentrations is of concern due to its properties as greenhouse gas and its contribution to the phenomena of global warming and climate change. Prototype demonstration facilities for the capture and sequestration of carbon dioxide exist in several countries. While various technologies exist for the capture and concentration of carbon dioxide in combustion flue gases, most current facilities utilise underground sequestration known as geosequestration. This may occur in depleted oil or gas reservoirs or other underground porous formations that are suitably isolated from the atmosphere. These reservoirs or formations may be situated under land or sea. Another possible subterranean repository for carbon dioxide gas are so-called saline aquifers. Direct storage of carbon dioxide in the deep ocean has also been investigated but has yet to be successfully demonstrated on any significant scale.

Another field of study is that known as mineral carbonation; whereby carbon dioxide is chemically reacted with alkaline and alkaline-earth metal oxide or silicate minerals to form stable solid carbonates. The use of this route in a mineral carbonation process plant using minerals that have been extracted and processed is known as ex-situ mineral carbonation, as opposed to in-situ carbonation whereby carbon dioxide is deposited into underground mineral formations and reacts over longer timeframes with such minerals in existing underground formations. The present invention is concerned with the ex-situ approach to carbon dioxide sequestration via mineral carbonation.

The invention assumes that a stream containing carbon dioxide is available for such mineral carbonation. Such streams may originate from flue gases from any combustion process, or from processes known in the art as gasification or gas reforming, as well as from typical chemical manufacturing processes such as ammonia or Portland cement manufacture. The concentration of carbon dioxide in such streams may be substantially raised via technological routes known in the field. These include so-called carbon capture technologies such as those employing membrane separation technology or alternatively those employing carbon dioxide solvents such as amines. In the latter case, these solvents capture the carbon dioxide from dilute streams such as flue gases and then undergo solvent regeneration to release the concentrated streams of carbon dioxide and the regenerated solvent for use in further capture. Alternatively, in a process known as "oxy-fuel combustion", streams of concentrated carbon dioxide and water vapour may be formed directly in the combustion processes via the use of oxygen rather than air to feed the combustion process. Another process known as gasification produces hydrogen and relatively pure carbon dioxide streams through the gasification of hydrocarbonaceous fuels under suitable process conditions.

The present invention is concerned with the solidification of such streams of carbon dioxide in the process of mineral carbonation as described herein. While it is advantageous to use such highly concentrated streams of carbon dioxide in the present invention, the use of lower purity streams is not precluded. In particular, the presence of water in such streams is not necessarily unfavourable since the process uses aqueous slurries whose water content may be readily adjusted if required. Furthermore, the key aspects of the current invention may be applied to slower or less intensive processes for carbon dioxide sequestration. These may include for example carbon dioxide sequestration from the atmosphere. The present invention provides the appropriate integrated activation process for the alkali or alkali earth metal silicate feedstocks and the necessary integrated solvent processes for the carbonation reactions required for viable ex-situ sequestration.

By way of example only, the following reviews and papers describe these various sequestration technologies and their status:

Metz, B., Davidson, O., De Coninck H., Loos. M and Meyer, L. (eds), 2006. Carbon Dioxide Capture and Storage—IPCC Special Report, UN Intergovernmental Panel on Climate Change, ISBN92-9169-119-4.

Herzog, H., 2002. Carbon Sequestration via Mineral Carbonation: Overview and Assessment (available on the MIT University website for Carbon Capture & Sequestration Technologies).

Huijgen, W. J. J. and Comans, R. N. J., 2005. Carbon dioxide sequestration by mineral carbonation—Literature Review Update 2003-2004, ECN-C-05-022.

Lackner, K. S., Grimes, P. and Ziock, H-J., 2001. Capturing Carbon Dioxide From Air, $1^{st}$ *National Conference on Carbon Sequestration May* 14-17, 2001, USA (available on the website for the National Energy Technology Laboratory, Department of Energy, USA).

O'Connor, W. K., Dahlin, D. C., Rush, G. E., Gerdemann, S. J., Penner, L. R. and Nilsen, D. N., 2005. Aqueous Mineral Carbonation—Mineral Availability, Pre-treatment, Reaction Parametrics and Process Studies—Final Report, DOE/ARC-TR-04-002, Albany Research Center, US DOE.

ZECA Corporation, 2006. Overview-carbon dioxide.

Furthermore, some examples of related prior art in the patent literature made reference to here are listed below:

United States Patent Application US 2001/0022952 A1 by Rau and Caldeira, Method and Apparatus for Extracting and Sequestering Carbon Dioxide.

United States Patent Application US 2004/0131531 A1, Geerlings, Mesters and Oosterbeek, Process for Mineral Carbonation with Carbon Dioxide.

United States Patent Application No. 2004/0126293 A1 by Geerlings and Wesker, Process for Removal of Carbon Dioxide from Flue Gases.

United States Patent Application US 2004/0213705 A1 by Blencoe, Palmer, Anovitz and Beard, Carbonation of Metal Silicates for long-term $CO_2$ Sequestration.

US Patent Application No. 2004/0219090 A1 by Dziedic, Gross, Gorski and Johnson, Sequestration of Carbon Dioxide.

United States Patent Application No. US 2005/0180910 A1 by Park and Fan, Carbon Dioxide Sequestration using Alkaline Earth Metal-Bearing Minerals.

Mineral carbonation has a number of potential advantages over other methods of carbon dioxide sequestration. These include relative permanence and stability and the elimination of any risks of leakage of carbon dioxide gas. Furthermore, suitable subterranean sites for geosequestration do not exist at all locations where they are required. The chemical reactions of mineral carbonation are also thermodynamically favoured, with an exothermic release of energy due to the formation of the carbonates. Many of the minerals required for mineral carbonation are abundant and widely distributed globally. These minerals may be readily mined and subjected to known comminution and other technologies. They are generally benign and the environmental and safety risks are readily manageable. In particular, the mineral broadly known as serpentine has been estimated to be available in quantities sufficient to sequester all global emissions of carbon dioxide from known fossil fuel reserves.

Examples of mineral carbonation chemical reactions are given here:

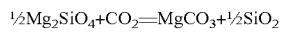

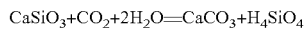

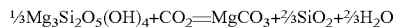

The latter example is that of serpentine, which is a favourable feedstock due to its relative abundance. Much attention has been focussed on serpentine for that reason.

However, to date mineral carbonation is still only recognised as being in the research phase with no viable industrial processes being reported. The review by Metz et al. (2006) to the United Nations Intergovernmental Panel on Climate Change concludes that the energy required for carbonation would be in the range 30-50% of the energy output of the associated coal-fired power plant, rendering mineral carbonation unviable. They note that research efforts are directed at finding routes to increase the reaction rates and make the carbonation process more energy efficient. Leading researchers in this field from the Albany Research Center (O'Connor et al., 2005), similarly concluded in their final report on aqueous mineral carbonation that the cost of carbon dioxide sequestration via mineral carbonation would be in the range US$ 54-199 per tonne of carbon dioxide. They conclude that olivine and wollastonite exhibit the best potential for utilisation in industrial process and dismiss serpentine as completely unviable due to the high energy input required for activation of serpentine. They do not teach any means of achieving such a viable activation and their calculations are based on the use of electrical energy for activation of serpentine. They conclude that the use of serpentine in ex-situ industrial processes can be ruled out and label it as an impractical methodology. They conclude further that the only likely application of serpentine in sequestration is as a slowly reactive matrix for in-situ geosequestration of carbon dioxide.

Various researchers have continued to explore methods of improving the reactivity of serpentine and other alkali metal or alkaline earth metal containing minerals. For example, US Patent Application No. US 2005/0180910 A1 by Park and Fan presents a process that alters the pH of the mineral suspension and utilises a fluidised bed reactor with internal grinding media to activate the serpentine. Their invention relates to the dissolution of magnesium-containing minerals in weak acids assisted by physical surface activation and subsequent increasing of the pH of the solution after contact with carbon dioxide to precipitate the carbonates and sulphates. Their methodology has been described in US Patent Application No. US 2005/0180910 A1. The invention of Park and Fan does not teach any thermal activation of the magnesium-containing mineral by any means nor several of the associated process improvements or applications of the present invention.

ZECA Corporation (2006) has published information on a process to sequester carbon dioxide emissions from coal-fired electricity generation using mineral carbonation of magnesium silicate minerals. However, no direct teaching of a viable process to achieve this is given, although reference is made to a patent-pending process based on the work of the Albany Research Center. As noted herein however, published work from the workers at Albany Research Center has ruled out the use of serpentine in ex-situ mineral sequestration of carbon dioxide and has not taught a means of achieving a viable process.

Other prior art teaches other methods and technologies that do not anticipate the current invention. For example, US Patent Application No. 2004/0126293 A1 by Geerlings and Wesker reports on a process that utilises the heat release from a mineral carbonation reaction to provide heat for the regeneration of solvent used in carbon dioxide capture processes from flue gases. No teaching is made in relation to the mineral carbonation process itself.

In another US Patent Application No. 2004/0131531 A1, Geerlings et al. describe a process for mineral carbonation wherein carbon dioxide is reacted with a bivalent alkaline earth metal silicate which is immersed in an aqueous electrolyte solution. It is noted that such disclosure of an electrolyte salt had been made earlier by O'Connor et al. (2001). No mention is made in US Patent Application No. 2004/0131531 A1 in relation to activation of such bivalent alkaline earth metal silicate. The examples given in said application by Geerlings et al. are limited to wollastonite and no activation is required for the carbonation reaction.

US Patent Application No. 2004/0213705 A1 by Blencoe et al. describes a process for sequestering carbon dioxide from a gas stream via dissolution of a metal silicate with a caustic material to produce a metal hydroxide and subsequently contacting said metal hydroxide with the carbon dioxide to produce a metal carbonate. No teaching is given in relation to other non-caustic routes to carbonation, nor to other means of activation of the metal silicate. It is noted that methods that require strong caustic or acidic dissolution of the metal are expected not to be viable industrial processes for large-scale carbon dioxide sequestration due to the high energy and raw material requirements to provide such strong caustic or acid solvents in large quantities.

US Patent Application No. 2001/0022952 A1 by Rau and Caldeira describes a process for sequestering carbon dioxide from a gas stream by hydrating the carbon dioxide to form carbonic acid and reacting the resulting carbonic acid with a carbonate. This process is quite different to that of the current invention.

US Patent application No. 2004/0219090 A1 by Dziedic et al. describes a process for removing carbon dioxide from a gaseous stream by diffusing carbon dioxide into water, adding a catalyst to accelerate the conversion of the carbon dioxide to carbonic acid and adding a mineral ion to form a precipitate of a salt of the carbonic acid. This process is also quite different to that of the current invention, although may be advantageously used in conjunction with the current invention particularly for the sequestration of carbon dioxide directly from the atmosphere.

Hitherto no research or prior art has described a process that is capable of successfully providing for sequestering carbon dioxide by reaction with alkali metal or alkaline earth metal silicates to form alkali metal or alkaline earth metal carbonates in an integrated way that is both energy efficient and technically and economically viable for industrial operations. It would be highly advantageous to provide such a process. All published work on aqueous routes has concluded that the energy penalty for activation and dehydroxylation of alkali metal or alkaline earth metal silicate minerals such as serpentine rule out this approach for viable industrial carbonation processes. It has now been discovered however that an integrated process with direct thermal activation via combustion combined with suspension in suitable solvents and the application of selected process routes renders the overall mineral carbonation process, especially for feedstocks such as serpentine, far more energy efficient and economically viable than has heretofore been envisaged. This new approach renders mineral carbonation using serpentine a viable industrial process for the first time. Economic viability depends on achieving a relatively low overall cost per tonne of carbon dioxide sequestered, preferably costs that would be below the market prices of carbon dioxide under regimes of carbon taxes or carbon emissions trading or permits. The present invention provides such a process.

Accordingly, the present invention provides a process for the solidification of carbon dioxide of by reaction of carbon dioxide with an alkali metal or alkaline earth metal silicate feedstock to form a corresponding alkali metal or alkaline earth metal carbonate, which process comprises direct thermal activation of the alkali metal or alkaline earth metal silicate feedstock by combustion of fuel to produce an activated feedstock, suspending the activated feedstock in a solvent slurry and contacting the activated feedstock with carbon dioxide to convert the carbon dioxide to form an alkali metal or alkaline earth metal carbonate.

The process of the present invention advantageously provides a means for sequestering carbon dioxide by conversion of carbon dioxide into stable alkali metal or alkaline earth metal carbonates. The process thereby provides a means for reducing the amount of carbon dioxide released to the atmosphere.

An important aspect of the present invention involves direct thermal activation of the alkaline or alkaline earth metal silicate feedstock for reaction with carbon dioxide. Activation is achieved by combustion of a fuel with the heat released being applied directly to the feedstock. In the context of the present invention the use of electricity to provide the heat for activation of the feedstock, for example, using an electric furnace, would involve indirect thermal activation since the heat of combustion of fuel (to generate electricity) is not being applied directly to heat the feedstock. This is energetically disadvantageous.

In accordance with the present invention the fuel used to achieve direct thermal activation of the feedstock is invariably a carbonaceous or hydrocarbonaceous fuel, such as coal, oil or natural gas.

Thermal activation of the feedstock may take place in any suitable heating vessel. This will usually take the form of a kiln, furnace or similar combustion chamber or heater. The feedstock may be contacted with the combustion gases from the fuel or may be heated via radiation, conduction or convection from the fuel combustion chamber. The heating vessel may be designed to provide turbulent or dispersive or attritive conditions to assist in achieving the dehydroxylation of the feedstock essential for activation. Thus, the reaction vessel may be designed to rotate and/or agitate the feedstock during heating thereof to assist in dehydroxylation (activation).

The feedstock is typically transported as a ground solid through the heating vessel. In one embodiment the heating vessel may be of vertical shaft design comprising one or more substantially vertical chambers and wherein the feedstock is charged and flows counter-currently to gases produced by the combustion of the fuel. Alternatively, the solid feedstock may be transported through the heating vessel in fluid media in pipes or vessels, such fluids being either gases or liquids.

Reaction of carbon dioxide with activated feedstock is exothermic. In an embodiment of the invention the activated feedstock is pre-heated prior to direct thermal activation using heat liberated by the exothermic (downstream/subsequent) reaction. In this embodiment a series of heat exchanges may be used to convey heat to the feedstock. Additionally, or alternatively, pre-heating may utilise low grade or waste heat from an associated carbonaceous or hydrocarbonaceous combustion, gasification and/or reforming process. Pre-heating of the silicate feedstock in this way will make the process of the invention more energetically economical.

Pre-heating may utilise a series of heating vessels successively utilising the exothermic heat of the subsequent carbonation reaction and/or low grade or waste heat from an associated carbonaceous or hydrocarbonaceous fuel combustion, gasification or reforming process Activation of the silicate feedstock typically involves raising and finally maintaining the temperature of said feedstock to a temperature of from about 580 and 800 degrees Celsius. While the use of heat from the exothermic heat of the carbonation reaction and/or low grade or waste heat from an associated hydrocarbon fuel combustion, gasification or reforming process for pre-heating the alkali metal or alkaline earth metal containing streams may make this process more energy and cost efficient, these steps are not absolutely essential. All of the energy required to achieve activation energy may be supplied by an efficient heating vessel. This process, particularly with agitation applied in the combustion vessel or heater, has now been found to provide a more energy-efficient and hence industrially viable process for carbon dioxide sequestration via ex-situ mineral carbonation.

Preferably, the activated feedstock suspended in a solvent slurry is subsequently contacted with supercritical, liquefied or high-pressure gaseous carbon dioxide to substantially convert the carbon dioxide to alkali metal or alkaline earth metal carbonates. The term high-pressure in the context of this disclosure refers to pressures in excess of 5 bar, more preferably in excess of 20 bar.

The most suitable fuel for combustion may be the same fuel used in the associated hydrocarbon fuel combustion, gasification or reforming process, carbon dioxide emissions from which are to be subject to the mineral carbonation process of this invention. In general, due to the high masses of mineral required to sequester carbon dioxide emissions, a mineral carbonation plant should desirably be sited close to the alkali metal or alkaline earth metal silicate mine or quarry. Where the site of the mineral carbonation plant is remote from the associated carbonaceous or hydrocarbonaceous fuel combustion, gasification or reforming process plant, the carbon dioxide has to be transported to the mineral carbonation plant via pipelines or the like and the option of using low grade or waste heat from the said associated plant is not available. In general, larger masses of mineral are required than the corresponding masses of carbonaceous or hydrocarbonaceous fuel used in the associated combustion, gasification or reforming process plant whose carbon dioxide emissions are subject to the mineral carbonation process. This makes it more favourable to situate such a combustion, gasification or reforming process plant in close proximity to the alkali metal or alkaline earth metal silicate mine or quarry itself. Transport of the carbonaceous or hydrocarbonaceous fuel to the combined combustion and carbonation plant site is thus less costly in an overall sense and is the preferred option.

The associated hydrocarbon fuel combustion, gasification or reforming process may comprise or form part of a coal, oil or gas-fired electricity generation plant, ammonia or other chemical manufacturing plant, Portland cement plant or the like. Most commonly the said associated plant will be an electricity generation plant, most commonly a coal-fired electricity generation plant.

In a particular embodiment of this invention the carbonaceous or hydrocarbonaceous fuel used in the combustion, gasification, reforming or electricity generation plant comprises at least 20%, preferably 20-100%, of fuel derived from renewable biomass, thus providing an overall process for the net removal of carbon dioxide from the atmosphere while providing thermal or electrical energy or hydrogen for utilisation in downstream energetic processes.

Similarly, the carbonaceous or hydrocarbonaceous fuel that is combusted to provide thermal energy to the alkali metal or alkaline earth metal silicate feedstock may advantageously comprise at least 20%, preferably 20-100%, of fuel derived from renewable biomass. This provides a process of thermal activation that does not produce excessive additional carbon dioxide from the mineral carbonation process itself. Renewable biomass fuel is particularly suited to this thermal activation process since temperatures below about 800 degrees Celsius are required. Advantageously, oxygen or oxygen enriched air may be fed into the heating vessel to provide a flue stream made up largely of carbon dioxide and water that may be fed back into the mineral carbonation plant for sequestration of the carbon dioxide.

The most preferable alkali metal or alkaline earth metal silicate feedstock is serpentine or one of its polymorphs. However, feedstocks drawn from the group comprising serpentine and any of its polymorphs antigorite, lizardite or chrysotile, olivine, brucite, dunite, peridotite, forsterite, wollastonite, talc, harzburgite, and mixtures thereof, may be used in the present invention.

In general the feedstock will be subjected to comminution by crushing and/or grinding subsequent to its extraction. Comminution to the final desired particle size distribution for the carbonation reaction may be done either before or after the direct thermal heating step. The said final desired particle size distribution for the carbonation reaction is about 75 microns or less. It may be advantageous to perform comminution to a size of about 200 microns or less prior to said direct combustion heating followed by subsequent further comminution to the said final desired particle size distribution for the carbonation reaction. Such subsequent grinding may advantageously be done in a wet grinding process with the activated feedstock mixed with the solvent slurry prior to the mineral carbonation step.

The most preferable process involves pre-heating of the silicate feedstock using one or more heating vessels utilising heat recovered from the exothermic carbonation reaction, which will generally be at temperatures below 200 degrees Celsius, more commonly below about 150 degrees Celsius. Further heating may be achieved utilising low-grade heat recovered from an associated hydrocarbon fuel combustion, gasification or reforming plant, as described. Finally, and essentially for this process, the pre-heated silicate feedstock is heated in a suitable heating vessel to its required activation temperature of between about 580 and 800 degrees Celsius. These temperatures are considerably lower than those typically employed in calcining operations, making the use of such a heating vessel more energy efficient and allowing lower cost refractory materials to be used in its construction.

Suitable heating vessels include rotary kilns and shaft or tower kilns. The most energy efficient designs, such as multistage counter-current regenerative shaft or tower kilns, are preferred. It has been found that the most energy efficient designs used in other industrial applications such as the calcining of lime are particularly advantageous when suitably modified for application in the current invention. Such designs include fluidised bed kilns or alternatively rotary kilns with axial combustion chambers and multiple co-axial calcining chambers. The lower temperatures required for the activation of the silicate feedstock in the current application as compared to conventional calcining enable considerable reductions in the design requirements of such kilns. This enables both capital and operational cost savings to be achieved in employing this type of unit.

Agitation of the mineral feedstock in the heating vessel is beneficial to the process of activation of the feedstock and may advantageously be employed in the heating vessel. Such agitation may be applied via rotation in rotary kilns, preferably in the presence of some additional grinding and/or agitation media such as steel balls. Alternatively, some agitation may be obtained via counter-current gas flow in shaft or tower kilns or fluidised bed furnaces, again preferably in the presence of some additional grinding and/or agitation media.

Transport of the mineral feedstock through pipes or chambers in the heating vessel may alternatively be achieved by two-phase fluid/solid flow, said fluids comprising either gases or liquids. For the case of gas/solid flow, the carrier gas provides agitation and efficient heat transfer which may be enhanced by high gas flow rates during transport of said mineral feedstock through the heating vessel.

It may be advantageous to transport the mineral feedstock as slurry suspended in a liquid carrier as it passes through the heating vessel. In this regard, aqueous media are preferred, with the most preferable media comprising those used in the carbonation step; namely weakly acidic aqueous or mixed aqueous and/or saline or other liquid solvents. As for the carbonation reaction, the solvents may be chosen from any of water, weak acids such as those known in the prior art for example acetic acid, oxalic acid, ascorbic acid, phthalic acid, orthophosphoric acid, citric acid, formic acid or salt solutions of such weak acids, saline solutions, aqueous saline and sodium bicarbonate solutions, potassium bicarbonate solutions, mixed aqueous and alcohol solutions such as aqueous ethanol or methanol solutions, mixed aqueous and glycol solutions, mixed aqueous and glycerol solutions, or any combination thereof.

It is preferable that the ratio of liquids to solids in the direct thermal activation stage be kept low, and usually lower than that employed in the carbonation step in order to reduce thermal energy requirements in raising the slurry to its desired temperature range of between about 580 and 800 degrees Celsius for mineral activation. Under these conditions the liquids will generally be superheated. The presence of the liquid carrier assists in the dehydroxylation of the silicate feedstock, by providing efficient heat transfer, turbulent flow and some dissolution of the alkali metal or alkaline earth metal and by assisting disruption of silica layers.

In the embodiments for transport of the feedstock via fluid carriers, said carriers comprising either gases or liquids, the thermal energy supplied to the heating vessel may be reduced via recycling of the carrier fluid through said heating vessel. The solid mineral feedstock may be substantially separated from the carrier fluid after exiting the heating vessel and then recycled to carry more mineral feedstock through the heating vessel, thus maintaining most of the thermal energy of the heated fluid. Substantial solid/fluid separation may be achieved by well-known process methods such as gravity separation, centrifugal separation or filtration.

It will be appreciated that the use of process units such as kilns, furnaces or other heating vessels, comminution processes and reaction vessels referred to in this specification is not limited to any particular number of such vessels. Plural such units may be employed, either in series or parallel, in order to provide the required process throughput for any particular mineral carbonation facility. For example, in order to solidify and sequester about 15 million tonnes of carbon dioxide produced annually by a gigawatt-scale coal-fired electricity generation plant, about 40 million tonnes of serpentine would need to be processed annually. This requires a facility processing in excess of 100 kilotonnes of serpentine per day or in excess of 4500 tonnes per hour. Multiple large parallel processing units are required to meet such throughput.

Preferably, after the direct thermal activation step the activated feedstocks are suspended in weakly acidic aqueous or mixed aqueous and/or saline or other solvents prior to the carbonation step. Advantageously, the aqueous solvent system described by O'Connor et al. comprising an aqueous saline solution with sodium bicarbonate may be employed. Other suitable solvents that have been identified by workers in this field include potassium bicarbonate solutions.

Preferably, the said activated feedstocks suspended in the solvents are contacted with supercritical, liquefied or high-pressure gaseous carbon dioxide in highly turbulent or rapidly dispersive or attritive reaction vessels to substantially convert the carbon dioxide to carbonates. Preferably pressures in the range 10-200 bar, more preferably 50-160 bar and temperatures in the range 10-250 degrees Celsius, more preferably 10-175 degrees Celsius are employed in the reaction vessels.

Suitable reaction vessels may comprise high-pressure agitated vessels, pipeline reactors or the like, or more preferably, high velocity reaction vessels to promote turbulence, rapid mixing and attrition of the said activated feedstocks. Fluidised bed reactors such as described by Park and Fan, particularly with the addition of grinding media, may be advantageously employed. Furthermore, the process as described by Park and Fan of elevating the pH in said reaction vessel to facilitate precipitation of the carbonates may be advantageously applied.

According to another aspect of the invention, there is provided a process for long-term sequestration of carbon dioxide from the atmosphere into solid alkali metal or alkaline earth metal carbonates whereby, after mining of feedstock that comprise alkali metal or alkaline earth metal silicates, comminution and direct thermal activation of said feedstock, the activated feedstock are suspended in a solvent slurry comprising solvents that are miscible with liquid carbon dioxide and/or capable of increased dissolution of carbon dioxide and are contacted with carbon dioxide in reaction vessels to substantially convert the carbon dioxide to alkali metal or alkaline earth metal carbonates.

The solvents may be chosen from any of water, weak acids such as those known in the prior art for example acetic acid, oxalic acid, ascorbic acid, phthalic acid, orthophosphoric acid, citric acid, formic acid or salt solutions of such weak acids, saline solutions, aqueous saline and sodium bicarbonate solutions, potassium bicarbonate solutions, mixed aqueous and alcohol solutions such as aqueous ethanol or methanol solutions, mixed aqueous and glycol solutions, mixed aqueous and glycerol solutions or any combinations thereof. The final choice of solvent will be dependent on the need to provide suitable reaction conditions and buffering as taught by O'Connor et al. for the carbonation reactions as well as to provide suitable miscibility with the high-pressure, supercritical or liquefied carbon dioxide in the carbonation reaction vessel.

Another application of this invention may be in the sequestration of carbon dioxide drawn from dilute streams or directly from the atmosphere in order to reduce the carbon dioxide concentration in the atmosphere to mitigate the effects of global warming and climate change. In this regard, Lackner et al. presented a conceptual outline of such a process showing that from physical considerations it is feasible to construct structures to absorb substantial quantities of carbon dioxide from the air. They do not present any detailed chemical process for the absorption and solidification of the carbon dioxide except to name the use of calcium oxide as a possible substrate. It will be apparent to those skilled in the art that the processes such as those disclosed in the current invention may be adapted and used for such absorption and solidification of carbon dioxide from the atmosphere. Key aspects and the associated process improvements and applications disclosed herein may be employed in such processes. In particular, the use of the thermal activation processes via combustion disclosed herein and the solvent processes as described herein as well as the other various process improvements and applications described herein may be employed in such capture of carbon dioxide from the atmosphere. Atmospheric carbon dioxide may be concentrated prior to reaction, for example via such capture and concentration processes described by Lackner et al. or may be sequestered in dilute form, including direct reaction with atmospheric carbon dioxide. In the latter case, the sequestration may proceed more slowly than in high-pressure reaction vessels, nevertheless using suitably activated alkali or alkali earth metal silicates such as serpentine and/or suitably selected slurry solvents to convert the carbon dioxide to carbonates. Systems of open vessels, fields, slurry dams, absorption towers, aerated stockpiles or heap leach arrangements containing the activated serpentine or other alkali or alkali-earth metal silicate mixed with such solvents may be employed in this application Such vessels, fields, slurry dams, absorption towers or aerated stockpiles or heap leach arrangements may be designed to optimally expose the activated mineral to carbon dioxide, preferably dissolved as carbonic acid in aqueous media, via systems of sprays, atomizers, or channels. The reacted mineral, in the form of carbonates, should be periodically removed to allow exposure of unreacted mineral to the carbon dioxide or carbonic acid/aqueous flows. In the case of stockpiles for example, reacted layers may be periodically scraped off the exposed surfaces of said stockpiles. The removed material comprising carbonates may then be transported for disposal, such disposal being advantageously back in mined-out areas of the mineral feedstock mine or quarry.

It may be desirable to enhance the dissolution of atmospheric carbon dioxide into carbonic acid in aqueous media prior to reaction with the activated mineral. Such enhancement may be obtained via means known in the prior art, for example via the addition of enzyme catalysts such as carbonic anhydrase to the aqueous media as described by Dziedzic et al. Preferably, the enzyme catalyst would be recycled.

Various embodiments of a method for long-term sequestration of carbon dioxide into solid alkali metal or alkaline earth metal carbonates in accordance with the present invention will now be described, by way of example only, with reference to the accompanying drawings.

FIG. 1 illustrates a generalised flow diagram of the invention. It shows a process for activation of an alkali earth metal silicate ore, in this case largely serpentine ore, using the methodology of this invention. It shows a mine or quarry (1) where the ore is extracted, an associated combustion, gasification, reforming or electricity generation plant (2) whose carbon dioxide emissions are to be sequestered and a stream (3) containing the said carbon dioxide entering a mineral carbonation plant (5) designed according to the methodology of this invention. The serpentine ore is crushed and ground in comminution circuits (6) to a particle size of less than 75 microns and fed into a series of heat exchangers for activation. The first optional heat exchanger (7) utilises heat drawn from maintaining the carbonation reactor (8) at a temperature of 120-150 degrees Celsius drawing heat from the exothermic carbonation reaction within the said reactor. The second optional heat exchanger (9) utilises low grade heat drawn from an available low grade heat source (4) in the associated combustion, gasification, reforming or electricity generation plant (2), in this case further raising the temperature of the serpentine ore to around 300 degrees Celsius. The final and essential heating vessel (10) comprises a hydrocarbonaceous fuel-fired furnace, kiln or similar combustion chamber to provide direct thermal activation of the ore raising its temperature to around 580 to 800 degrees Celsius. The activated ore is mixed with a solvent (11) prior to entering the carbonation reactor vessel (8). The carbonation reaction (8) vessel may advantageously utilise agitation and attrition, either via mechanical means or flow-induced. The solvents (11) are aqueous mixtures of water with weak acids, and/or salts and/or sodium bicarbonate. The carbon dioxide-containing stream (3) is compressed via compressor (12) to a liquid form or to a pressure in excess of 150 bar prior to entering said carbonation reactor vessel (8). The solid carbonate and silica residues (13) are withdrawn for final disposal back to the mine or quarry (1) and the recovered solvents (14) are reused in the process.

The process illustrated in FIG. 1 has been demonstrated to be economically viable for the permanent solidification of 14.1 Mt per annum of carbon dioxide emissions from a standard conventional pulverised fuel electricity generation plant in Australia. The power station has four 660 MW generators that export about 15500 GWh per annum to the electricity grid and consumes 6.4 Mt per annum of black coal. The process shown in FIG. 1 achieves close to 100% permanent carbon dioxide sequestration with about 41 Mt per annum of serpentine and additional coal consumption of 0.9 Mt per annum in the fuel-fired furnaces that activate the serpentine. Delivered electricity from the electricity generation plant would be reduced to 96.6% of the original supply without sequestration due to the requirement to supply electricity for the comminution of the serpentine. The process will avoid 14.1 Mt carbon dioxide at a cost of about Australian dollars A$22 per tonne of carbon dioxide. In terms of electricity generation costs, the penalty of nearly 100% carbon dioxide sequestration using this process has been demonstrated to be about 2.1 c/kWh.

Figure 4:
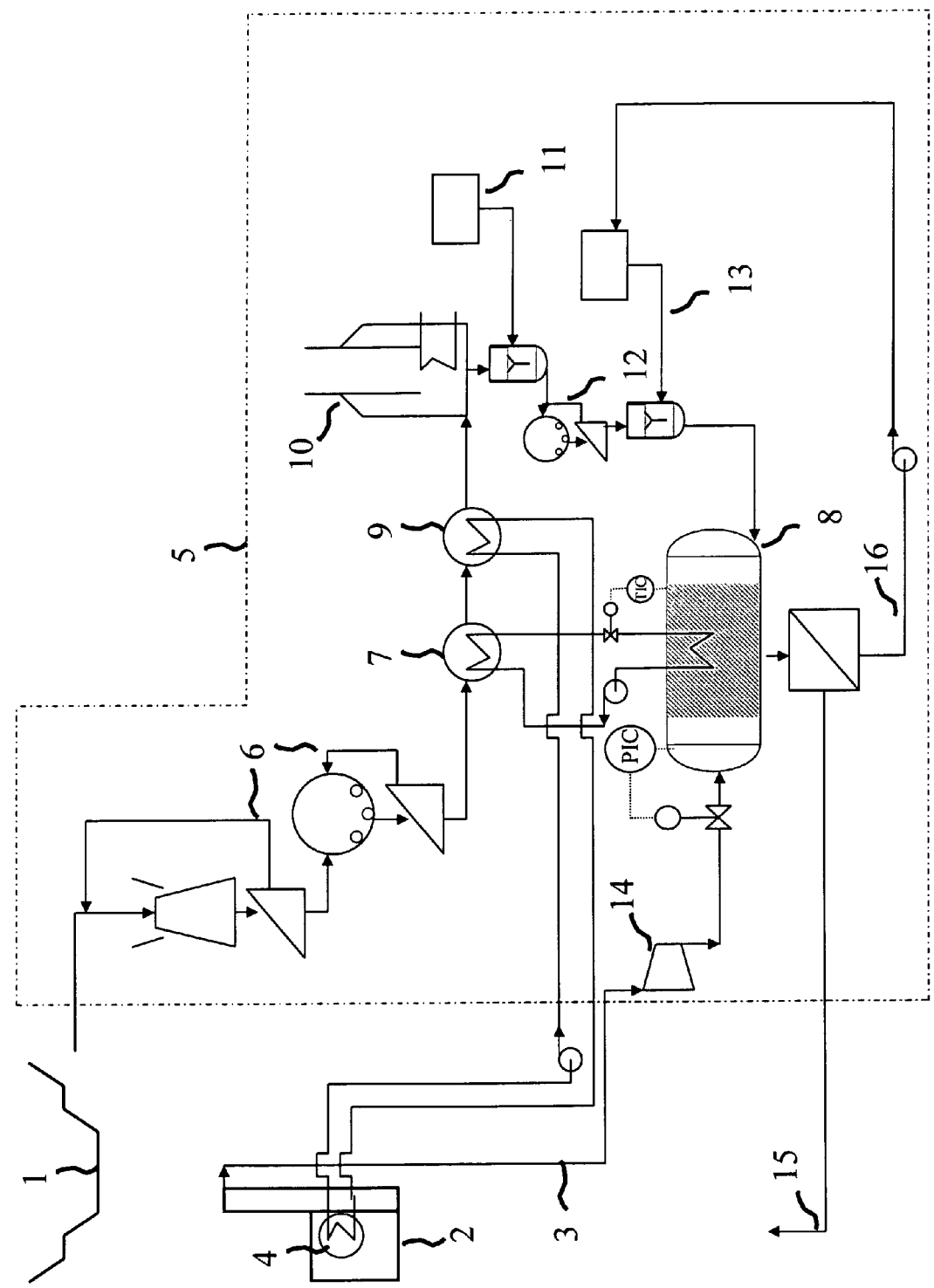

FIG. 4 illustrates another generalised flow diagram of the invention. It shows a process for activation of an alkali earth metal silicate ore, in this case largely serpentine ore, using the methodology of this invention. It shows a mine or quarry (1) where the ore is extracted, an associated combustion, gasification, reforming or electricity generation plant (2) whose carbon dioxide emissions are to be sequestered and a stream (3) containing the said carbon dioxide entering a mineral carbonation plant (5) designed according to the methodology of this invention. The serpentine ore is crushed and ground in comminution circuits (6) to a particle size of less than 200 microns and fed into a series of heat exchangers for activation. The optional first heat exchanger (7) utilises heat drawn from maintaining the carbonation reactor (8) at a temperature of 120-150 degrees Celsius drawing heat from the exothermic carbonation reaction within the said reactor. The optional second heat exchanger (9) utilises low grade heat drawn from an available low grade heat source (4) in the associated combustion, gasification, reforming or electricity generation plant (2), in this case further raising the temperature of the serpentine ore to around 300 degrees Celsius. The final and essential heat exchanger (10) comprises a hydrocarbonaceous fuel-fired furnace, kiln or similar combustion chamber to provide direct thermal activation of the ore raising its temperature to around 580 to 800 degrees Celsius. The heating vessel (10) is a two-stage counter-current tower furnace to improve thermal efficiency. Optionally, it may utilise a fluidised bed of the mineral ore. The activated ore is mixed with an aqueous solvent stream (11) containing a weak acid and subjected to further comminution in a wet-milling process (12) to a particle size of less than 75 microns before being mixed with additional solvents (13) comprising weak acids, and/or salts and/or sodium bicarbonate and optionally alcohol and/or glycol or glycerol solvent to render carbon dioxide more miscible prior to entering the carbonation reactor vessel (8). The carbon dioxide-containing stream (3) is mixed with carbon dioxide from the hydrocarbonaceous fuel-fired furnace, kiln (10) and compressed via compressor (14) to a liquid form or to a pressure in excess of 150 bar prior to entering said carbonation reactor vessel (8). The carbonation reaction (8) vessel may advantageously utilise agitation and attrition, either via mechanical means or flow-induced. The solid carbonate and silica residues (15) are withdrawn for final disposal back to the mine or quarry (1) and the recovered solvents (16) are reused in the process.

Figure 2:
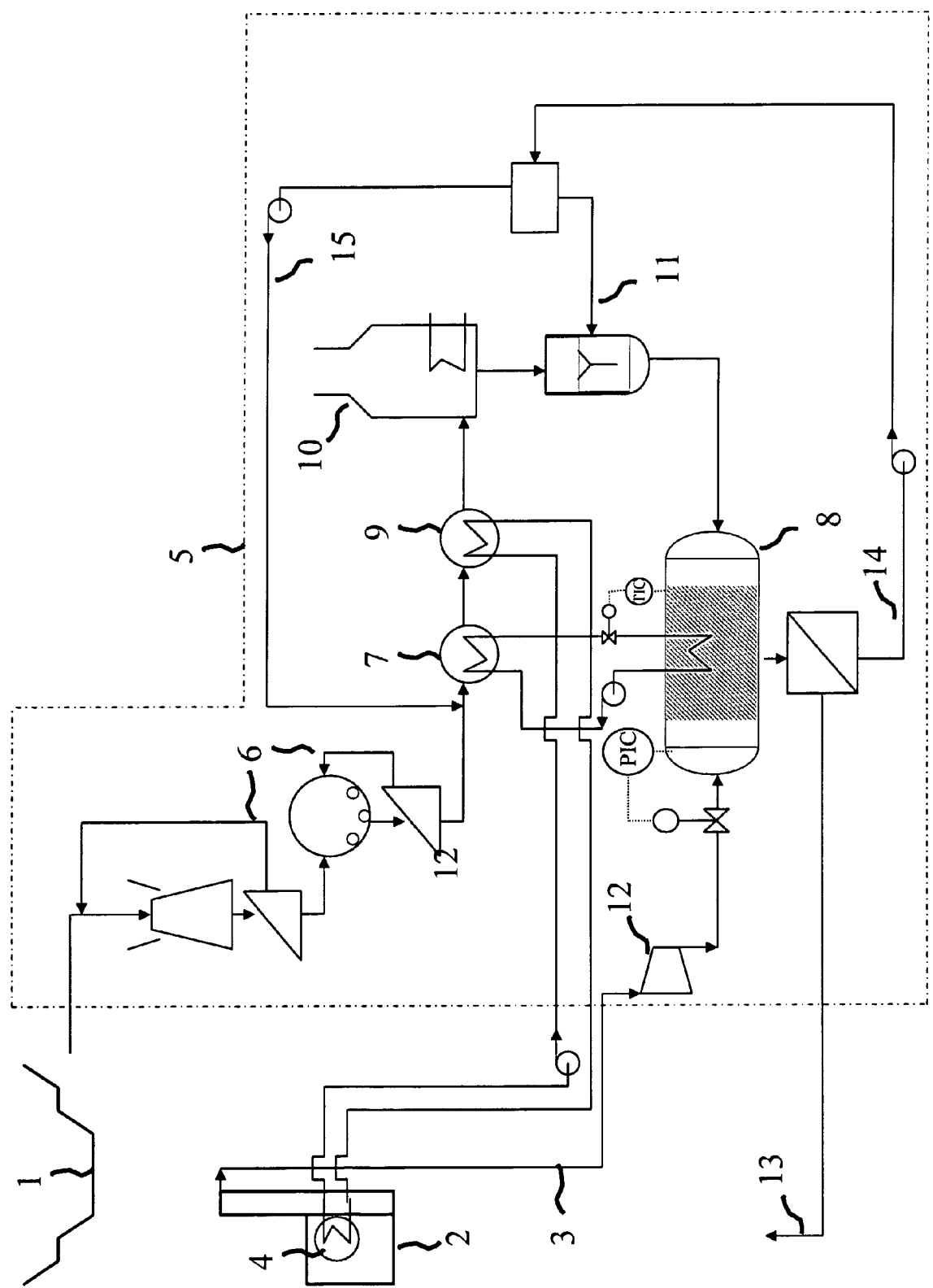
FIG. 2 illustrates another generalised flow diagram of the invention similar to FIG. 1. All components are identical to those illustrated in FIG. 1 except for the addition of a solvent stream (15) to the alkali earth metal silicate ore prior to thermal activation in order to transport said ore through the thermal activation heat exchangers.
Figure 3:
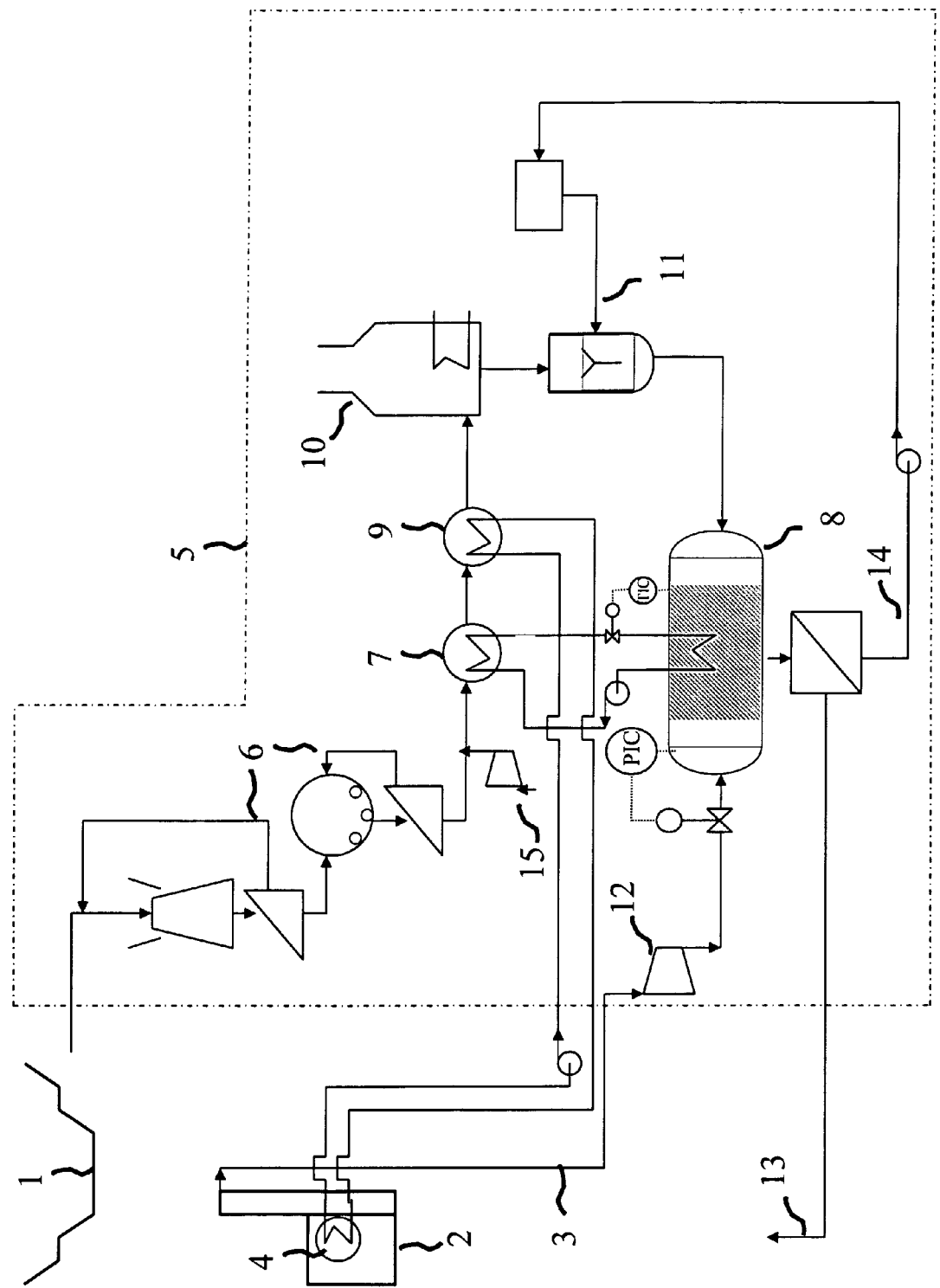
FIG. 3 illustrates another generalised flow diagram of the invention similar to FIG. 1. All components are again identical to those illustrated in FIG. 1 except for the addition of a gas stream (15), in this example compressed air, to the alkali earth metal silicate ore prior to thermal activation in order to transport said ore through the thermal activation heat exchangers.
Figure 5:
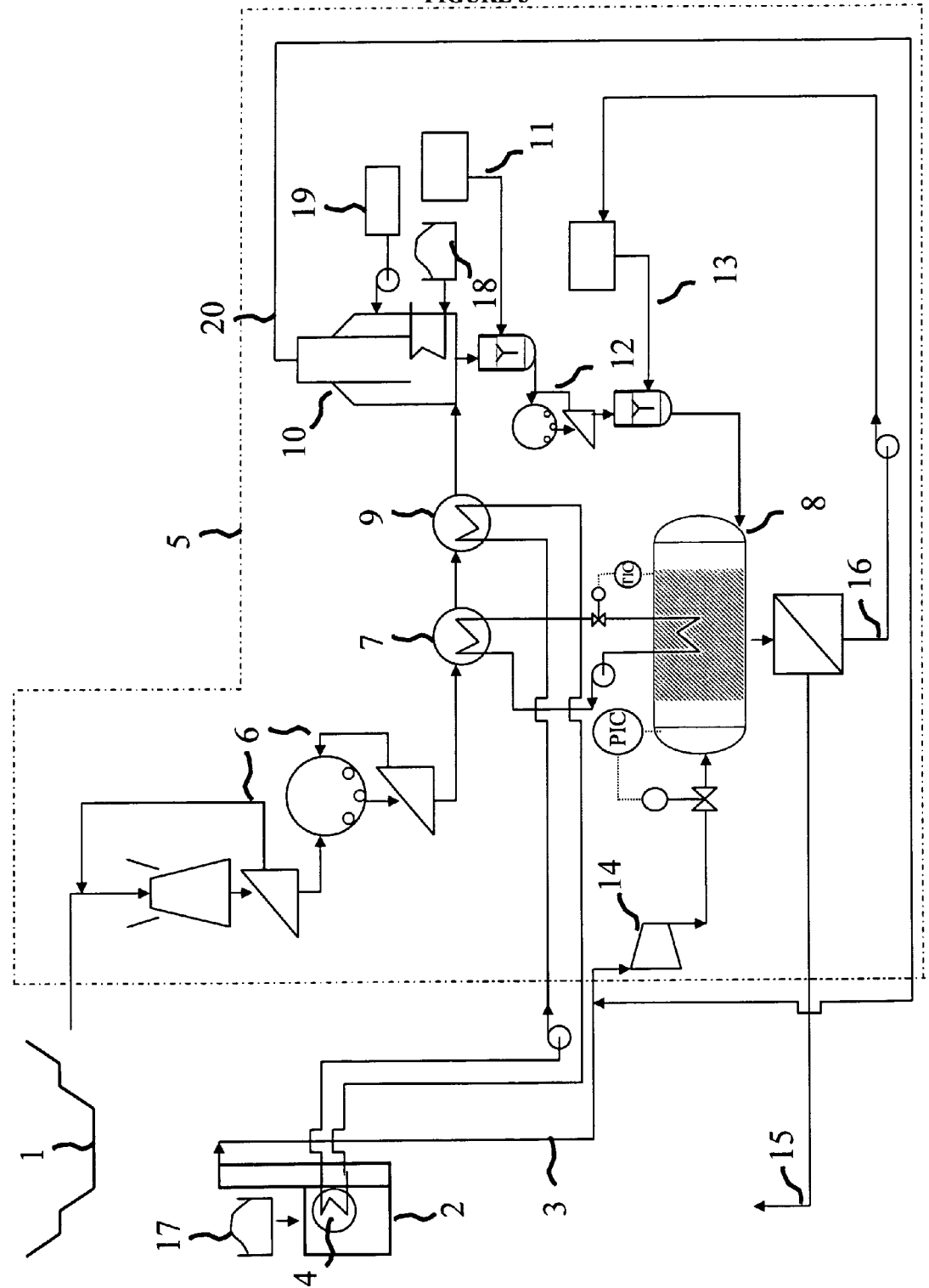

FIG. 5 illustrates another generalised flow diagram of the invention. In this case a similar process to that described in FIG. 2 applies and unless otherwise state here comprises components labelled as for FIG. 2. In this example the associated combustion, gasification, reforming or electricity generation plant (2) utilising between 20 and 100% of renewable biomass (17) yielding an overall process for the net removal of carbon dioxide from the atmosphere. In this example, the heating vessel (10) comprises a fuel-fired furnace, kiln or similar combustion chamber that similarly combusts hydrocarbonaceous fuel derived largely from renewable biomass (18) to provide direct thermal activation of the ore raising its temperature to around 580 to 800 degrees Celsius and is operated with an oxygen-rich feed stream (19) to provide a flue stream (20) largely comprising carbon dioxide and water vapour that is fed back into the mineral carbonation plant (5).

Figure 1:
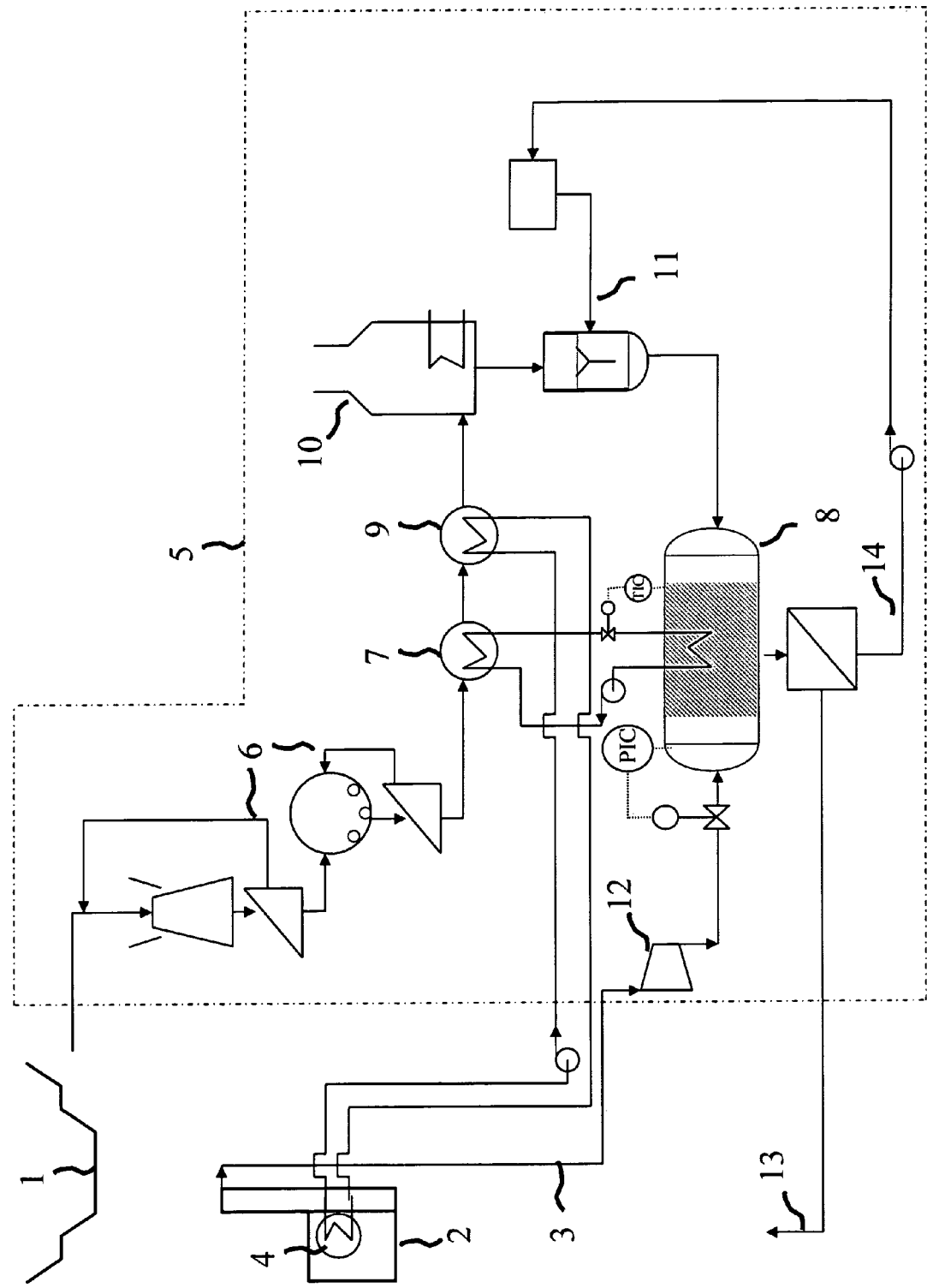
Figure 6:
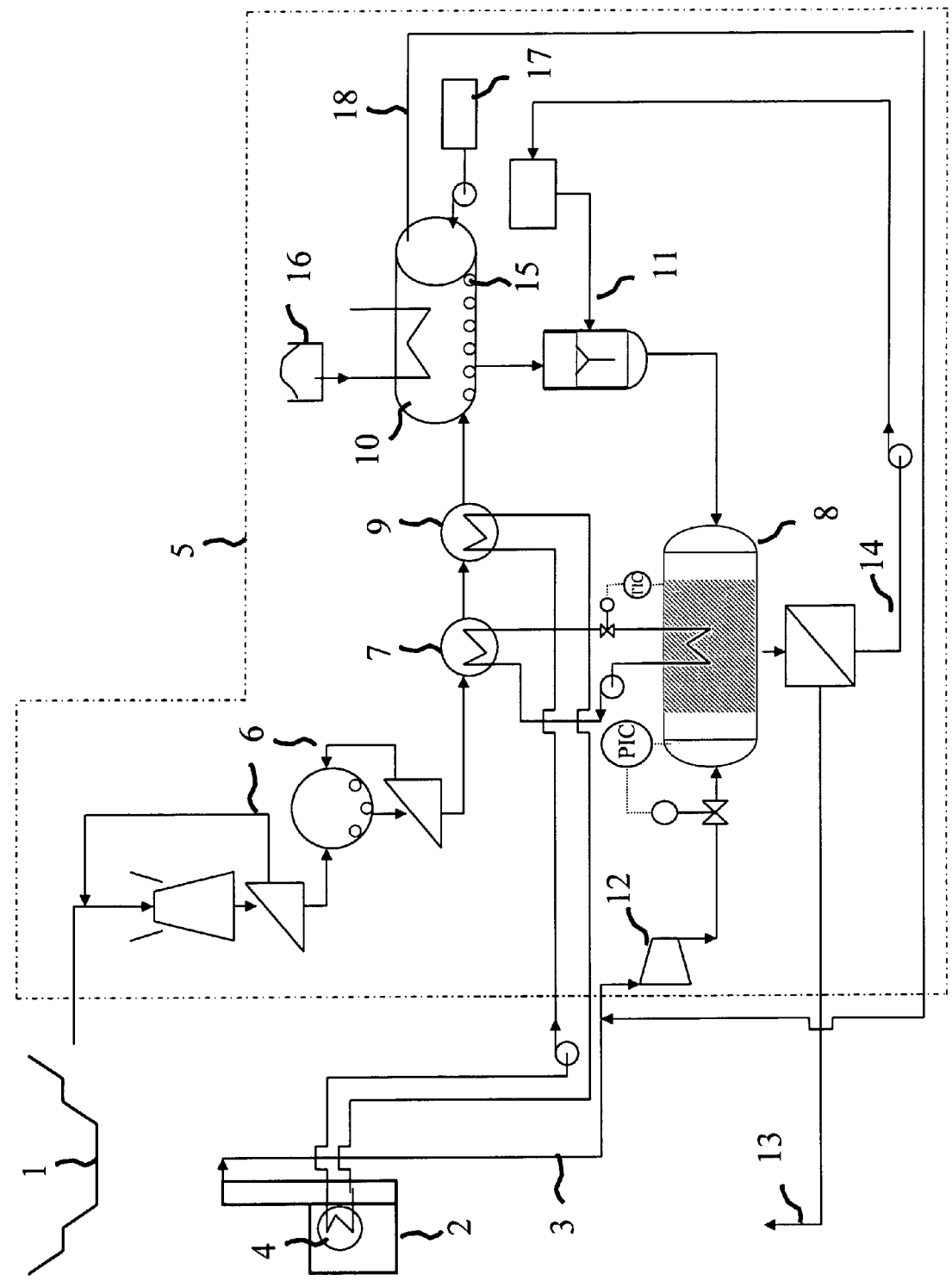

FIG. 6 illustrates another generalised flow diagram of the invention similar to that described in FIG. 1 and unless otherwise state here comprises components labelled as for FIG. 1. In this example the heating vessel (10) comprises a rotary kiln with grinding media (15) that provides mechanical agitation and attrition while simultaneously providing thermal activation of the ore by raising its temperature to around 580 to 800 degrees Celsius by combustion of hydrocarbonaceous fuel. This heating vessel (10) may optionally and advantageously be supplied by fuel comprising between 20-100% of renewable biomass (16) and may also optionally be operated with an oxygen-rich feed stream (17) to provide a flue stream (18) largely comprising carbon dioxide and water vapour that is fed back into the mineral carbonation plant (5).

Figure 7:
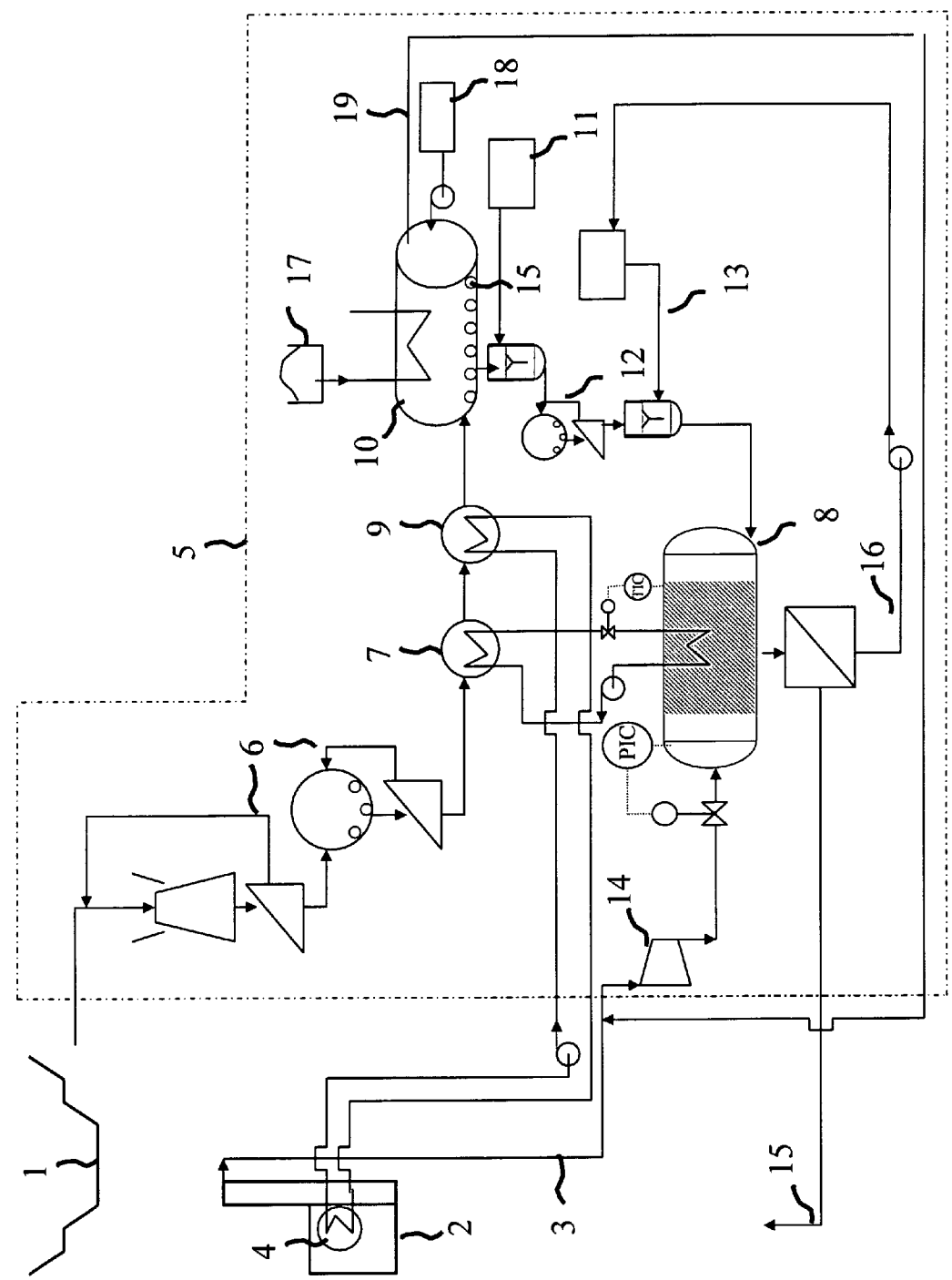

FIG. 7 illustrates another generalised flow diagram of the invention. In this example the process is similar to that shown in FIG. 2 and also incorporates some of the features shown in FIG. 4. Unless otherwise stated here the components are labelled as for FIG. 2 except that in this example the heating vessel (10) comprises a rotary kiln with grinding media (15) that provides mechanical agitation and attrition while simultaneously providing thermal activation of the ore by raising its temperature to around 580 to 800 degrees Celsius by combustion of hydrocarbonaceous fuel. This heating vessel (10) may optionally and advantageously be supplied by fuel comprising between 20-100% of renewable biomass (17) and may also optionally be operated with an oxygen-rich feed stream (18) to provide a flue stream (19) largely comprising carbon dioxide and water vapour that is fed back into the mineral carbonation plant (5). The activated ore is mixed with an aqueous solvent stream (11) containing a weak acid and subjected to further comminution in a wet-milling process (12) to a particle size of less than 75 microns before being mixed with additional solvents (13) including alcohol and/or glycol or glycerol solvent to render carbon dioxide more miscible prior to entering the carbonation reactor vessel (8). The carbonation reaction (8) vessel may advantageously utilise agitation and attrition, either via mechanical means or flow-induced. The carbon dioxide-containing stream (3) is mixed with carbon dioxide from the hydrocarbonaceous fuel-fired furnace, kiln (10) and compressed via compressor (14) to a liquid form or to a pressure in excess of 150 bar prior to entering said carbonation reactor vessel (8). The solid carbonate and silica residues (15) are withdrawn for final disposal back to the mine or quarry (1) and the recovered solvents (16) are reused in the process.

Figure 8:
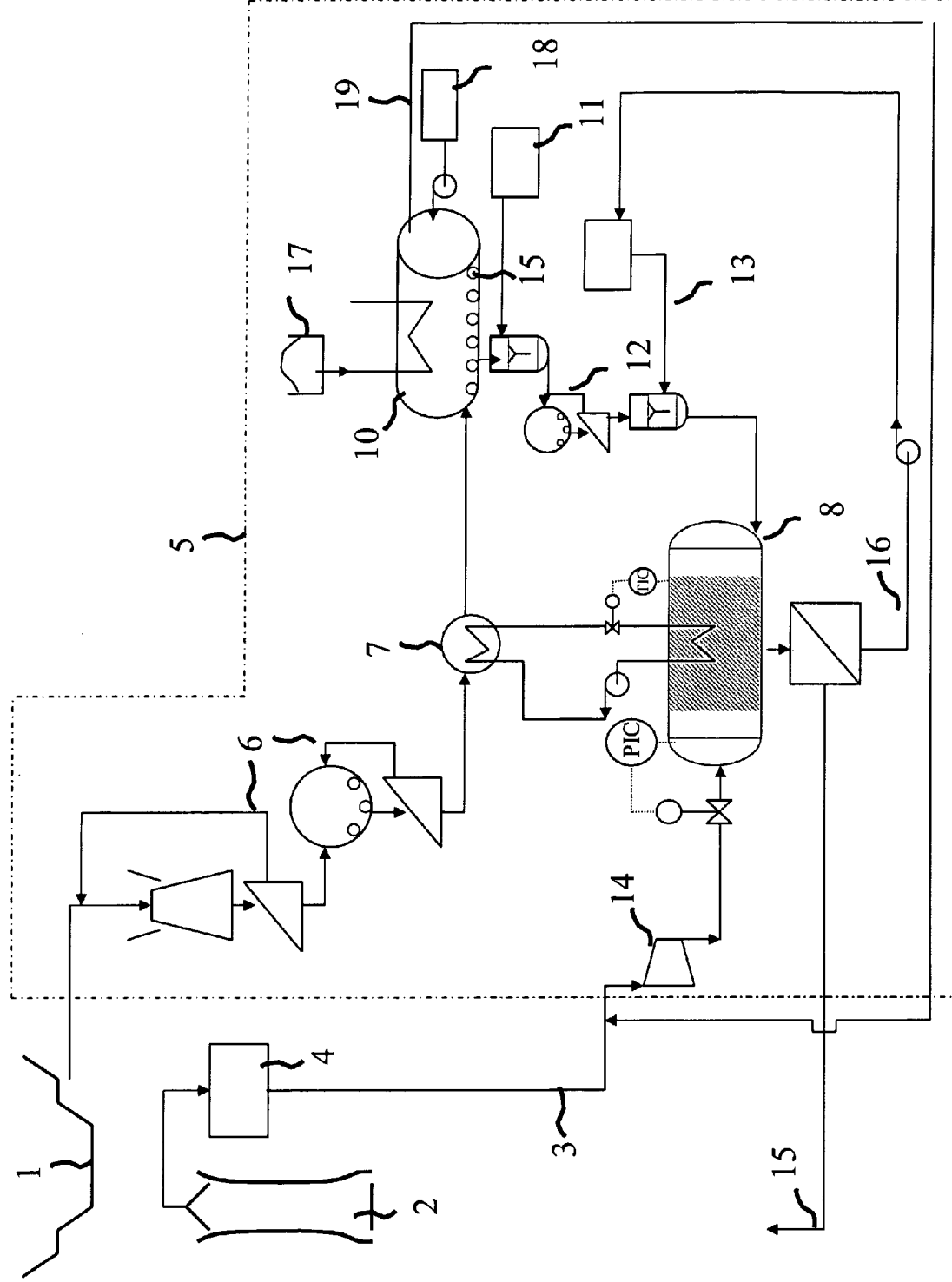

FIG. 8 illustrates another flow diagram of a particular embodiment of the invention. In this example the mineral carbonation plant (5) is similar to that shown in FIG. 5 however in this case it is used to sequester carbon dioxide from the atmosphere. The carbon dioxide is drawn from the atmosphere in a generic capture plant (2) that concentrates the carbon dioxide (4) and feeds it in a stream (3) to the mineral carbonation plant (5) whose details are similar to those of FIG. 5 and unless specified otherwise comprises components labelled as for FIG. 5.

Figure 9:
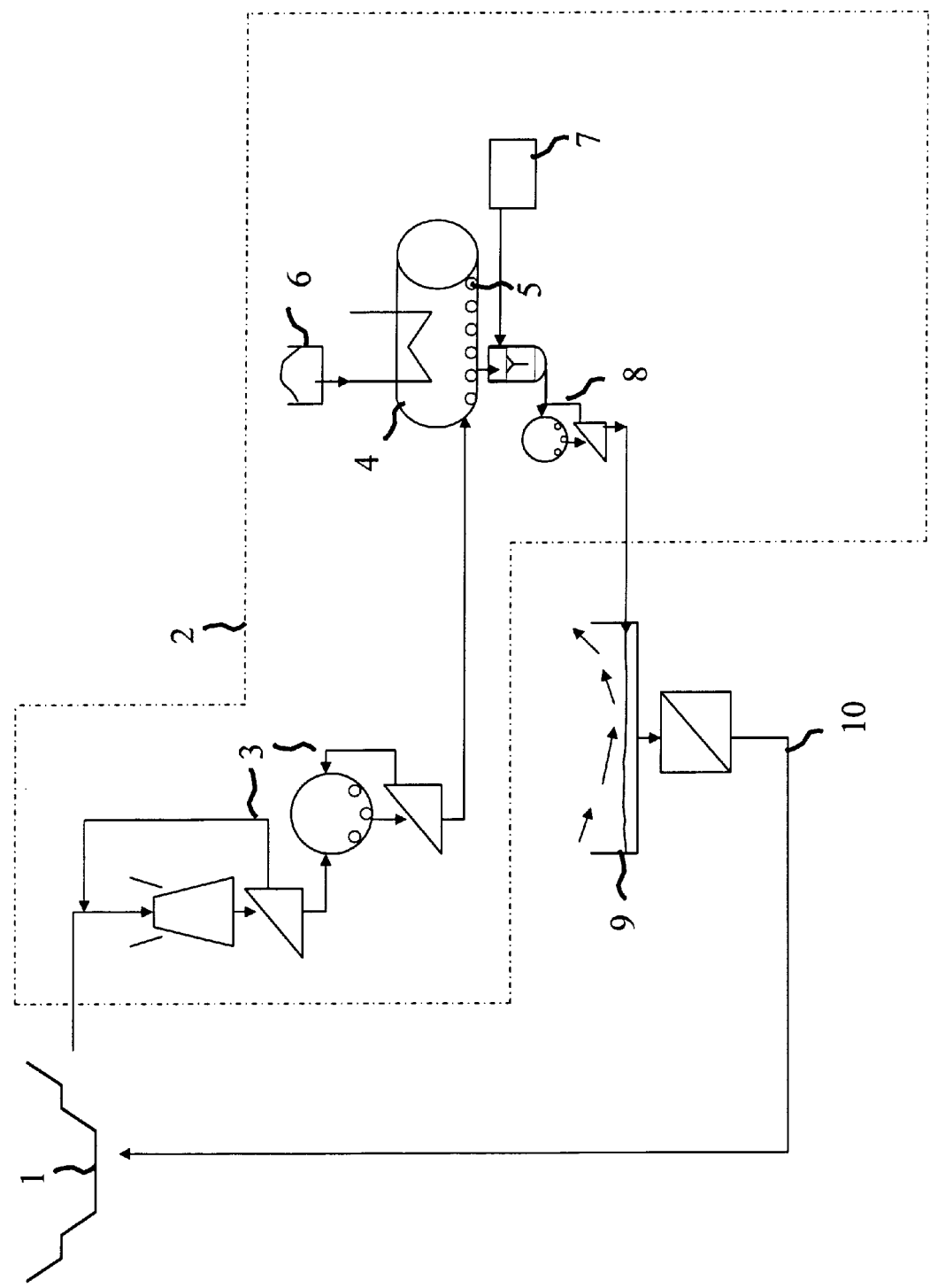

FIG. 9 illustrates another flow diagram of a particular embodiment of the invention. It shows a process for activation of an alkali earth metal silicate ore, in this case largely serpentine ore, using the methodology of this invention and the use of such activated ore to sequester carbon dioxide from dilute streams or under ambient conditions. It shows a mine or quarry (1) where the ore is extracted and the ore entering a mineral carbonation preparation plant (2) designed according to the methodology of this invention. The serpentine ore is crushed and ground in comminution circuits (3) to a particle size of less than 200 microns and fed into a heating vessel (4) comprising a hydrocarbonaceous fuel-fired furnace, kiln or similar combustion chamber to provide direct thermal activation of the ore raising its temperature to around 580 to 800 degrees Celsius. The heating vessel shown here is a rotary kiln containing internal grinding media (5), however it may optionally be a multi-stage counter-current tower furnace to improve thermal efficiency. Optionally, it may utilise a fluidised bed of the mineral ore. The activated ore is mixed with an aqueous solvent stream (7) containing mixtures of water with weak acids, and/or salts and/or sodium bicarbonate and subjected to further comminution in a wet-milling process (8) to a particle size of less than 75 microns. The activated ore is then exposed to dilute carbon dioxide streams in a carbonation zone (9) to convert the carbon dioxide to a mineral carbonate. Such carbonate may be periodically removed from the carbonation zone to expose unreacted activated ore to more carbon dioxide. The carbonation zone may comprise specifically designed vessels to perform such exposure to carbon dioxide and removal of reacted carbonate or may alternatively comprise large open fields, slurry dams, stockpiles or similar aerated structures or heap leach arrangements to expose the activated mineral to the carbon dioxide. Some addition of additional solvents or water may be required in this carbonation zone. The reacted carbonates and residue silicates (10) may be returned to the mine or quarry (1) for disposal. The carbonation zone (9) may itself be situated within the mine or quarry (1).

Figure 10:
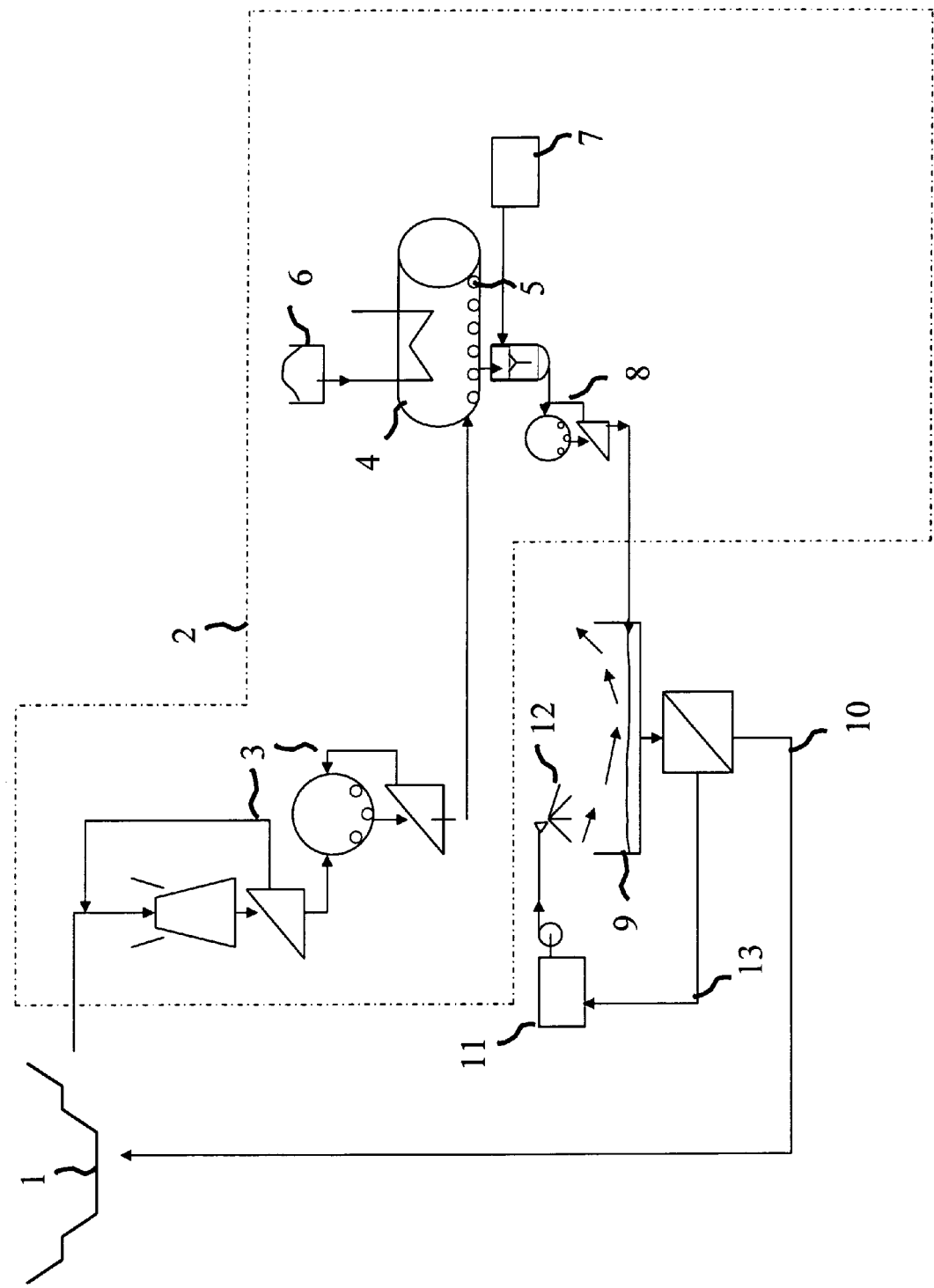

FIG. 10 illustrates another generalised flow diagram of the invention similar to FIG. 9. All components are identical to those illustrated in FIG. 9 except for the addition of a system of sprays or flow distributors (12) over the vessels, open fields, slurry dams, stockpiles or similar aerated structures or heap leach arrangements that spray aqueous solutions (11) that may contain catalytic enzymes such as carbonic anhydrase to accelerate formation of carbonic acid. These streams are recycled (13).

It will be apparent to those skilled in the art that various modifications, omissions or additions may be made without departing from the scope of the invention which is not limited to the specific embodiments and examples described herein. It is to be understood that the invention includes all such variations and modifications that fall within the spirit and scope. The invention also includes all of the steps, features, compositions and compounds referred to or indicated in this specification, individually or collectively, and any and all combinations of any two or more of said steps or features.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgement or any form of suggestion that prior art forms part of the common general knowledge of the countries in which this application is filed.

The claims defining the invention are as follows:

1. A process for the solidification of carbon dioxide by reaction of carbon dioxide with an activated alkali metal silicate feedstock or an activated alkaline earth metal silicate feedstock to form a corresponding alkali metal carbonate or alkaline earth metal carbonate, which process comprises direct thermal activation of an alkali metal silicate feedstock or alkaline earth metal silicate feedstock by combustion of fuel in a fuel fired furnace with the heat released by said combustion being directly applied to the alkali metal silicate feedstock or alkaline earth metal silicate feedstock, to produce an activated feedstock, then suspending the activated feedstock in a solvent slurry and reacting the activated feedstock with carbon dioxide to form the alkali metal carbonate or alkaline earth metal carbonate.

2. A process according to claim 1, wherein the alkali metal silicate feedstock or alkaline earth metal silicate feedstock is pre-heated prior to direct thermal activation by combustion of the fuel using heat liberated from the reaction of carbon dioxide with the activated feedstock and/or low grade or waste heat drawn from an associated carbonaceous or hydrocarbonaceous fuel combustion, gasification or reforming process.

3. A process according to claim 1, wherein direct thermal activation of the alkali metal silicate feedstock or alkaline earth metal silicate feedstock takes place by raising and maintaining the temperature of said feedstock to a temperature of from about 580° C. to 800° C.

4. A process according to claim 1, wherein the alkali metal silicate feedstock or alkaline earth metal silicate feedstock is heated in a heating vessel that is designed to rotate and/or agitate the feedstock during heating thereof.

5. A process according to claim 1, wherein the alkali metal silicate feedstock or alkaline earth metal silicate feedstock is heated in a heating vessel of a vertical shaft design comprising one or more substantially vertical chambers and wherein the feedstock is charged and flows counter-currently to gases produced by the combustion of the fuel.

6. A process according to claim 1, wherein the alkali metal silicate feedstock or alkaline earth metal silicate feedstock is heated via radiation, conduction or convection from a chamber in which combustion of the fuel takes place.

7. A process according to claim 1, wherein the alkali metal silicate feedstock or alkaline earth metal silicate feedstock is transported in pipes or vessels through the furnace in fluid media, such fluids being either gases or liquids.

8. A process according to claim 1, wherein the alkali metal silicate feedstock or alkaline earth metal silicate feedstock is subjected to comminution to reduce an average particle size of said feedstock to less than about 200 microns.

9. A process according to claim 1, wherein the activated feedstock is suspended in a weakly acidic aqueous or mixed aqueous and/or saline or other solvent miscible with carbon dioxide before and/or after the direct thermal activation.

10. A process according to claim 9, where the solvent is chosen from any one or more of water, weak acids or salt solutions of weak acids, saline solutions, aqueous saline and sodium bicarbonate solutions, potassium bicarbonate solutions, mixed aqueous and alcohol solutions.

11. A process according to claim 10, wherein the weak acid is selected from the group consisting of acetic acid, oxalic acid, ascorbic acid, phthalic acid, orthophosphoric acid, citric acid, and formic acid.

12. A process according to claim 10, wherein the mixed aqueous and alcohol solution is selected from the group consisting of aqueous ethanol or methanol solutions, mixed aqueous and glycol solutions, and mixed aqueous and glycerol solutions.

13. A process according to claim 1, wherein direct thermal activation of the alkali metal silicate feedstock or alkaline earth metal silicate feedstock by combustion of fuel occurs in a fluidised bed furnace or fluidised bed kiln.

14. A process according to claim 1, wherein the activated feedstock is mixed with an aqueous solvent stream containing a weak acid and subjected to further comminution after the direct thermal activation step in a wet-milling process to a particle size of less than 75 microns.

15. A process according to claim 1, wherein the activated feedstock is reacted with supercritical, liquefied or high-pressure gaseous carbon dioxide to substantially convert the carbon dioxide to alkali metal or alkaline earth metal carbonates.

16. A process according to claim 1, where the carbon dioxide and activated feedstock are reacted in a reaction vessel that is designed to provide highly turbulent or rapidly dispersive or attritive conditions to rapidly and substantially convert the carbon dioxide to alkali metal or alkaline earth metal carbonates.

17. A process according to claim 1, wherein the carbon dioxide is derived from emissions from a carbonaceous fuel combustion process, hydrocarbonaceous fuel combustion process, or hydrocarbon gasification process or reforming processes.

18. A process according to claim 17, wherein the carbon dioxide is derived from flue emissions from coal, oil or natural gas-fired electricity generation.

19. A process according to claim 1, wherein the carbon dioxide gas is derived from an ammonia manufacturing plant.

20. A process according to claim 1, wherein the carbon dioxide gas is derived from a Portland cement manufacturing plant.

21. A process according to claim 1, wherein the carbon dioxide is derived from the oxidation of at least 20% of fuel derived from renewable biomass.

22. A process according to claim 1, wherein the fuel comprises at least 20% of fuel derived from renewable biomass.

23. A process according to claim 1, wherein the alkali metal silicate feedstock or alkaline earth metal silicate feedstock comprises serpentine or a polymorph thereof, antigorite, lizardite, chrysotile, olivine forsterite, brucite, dunite, peridotite, wollastonite, talc, harzburgite, or a mixture of any two or more thereof.

24. A process according to claim 1, wherein the combustion of the fuel is achieved with the addition of oxygen-enriched streams to generate carbon dioxide and water vapour for ease of subsequent solidification into carbonates.

25. A process according to claim 1, wherein the alkali metal silicate feedstock or alkaline earth metal silicate feedstock is crushed in crushers and ground in mills in comminution circuits that draw electrical energy produced from an associated electricity generation plant.

26. A process according to claim 1, wherein the carbon dioxide is drawn directly from the atmosphere.

27. A process according to claim 26, wherein the reaction of carbon dioxide with the activated feedstock takes place in systems of open fields, slurry dams, stockpiles or heap leach arrangements containing the activated feedstock.

28. A process according to claim 27, wherein sprays, atomizers or channels are used to distribute aqueous streams through the systems of open fields, slurry dams, stockpiles or heap leach arrangements containing the activated feedstock.

29. A process according to claim 28, wherein carbonates produced by reaction of the carbon dioxide and activated feedstock are periodically removed from the systems.

30. A process according to claim 28, wherein an enzyme catalyst is added to the aqueous streams to accelerate the formation of carbonic acid.

* * * * *